United States Patent [19]

Seo et al.

[11] Patent Number: 5,550,682
[45] Date of Patent: Aug. 27, 1996

[54] MODE DISCRIMINATION CIRCUIT FOR AN IMAGE RECORDING/PLAYBACK SYSTEM UTILIZING PEAK DETECTORS

[75] Inventors: Jong-Soo Seo, Incheon; Ki-Ho Shin, Kyungki-do, both of Rep. of Korea

[73] Assignee: Samsung Electronics Co., Ltd, Suwon, Rep. of Korea

[21] Appl. No.: 134,944

[22] Filed: Oct. 13, 1993

[30] Foreign Application Priority Data

Oct. 13, 1992 [KR] Rep. of Korea ............... 1992-18834

[51] Int. Cl.⁶ ........................... G11B 5/02; G11B 15/46
[52] U.S. Cl. ........................................ 360/27; 360/73.06
[58] Field of Search ........................... 360/27, 77.11, 360/77.14, 77.09, 36.1, 29, 33.1, 79, 73.06, 72.05; 307/351; 358/335; 329/326; 327/58

[56] References Cited

U.S. PATENT DOCUMENTS

| | | | |
|---|---|---|---|
| 3,959,820 | 5/1976 | Braun | 360/77.05 |
| 4,163,909 | 8/1979 | Harr | 307/351 |
| 4,313,137 | 1/1982 | Weissmueller | 348/529 |
| 4,605,867 | 8/1986 | Veehof | 327/59 |
| 4,916,560 | 4/1990 | Kawaguchi | 360/73.09 |
| 4,949,195 | 8/1990 | Fujiwara | 360/33.1 |
| 4,991,027 | 2/1991 | Enoki | 360/27 X |
| 5,120,995 | 6/1992 | Abdi | 327/61 |
| 5,357,150 | 10/1994 | Jaquette | 327/72 |

Primary Examiner—Aristotelis Psitos
Assistant Examiner—Patrick Wamsley
Attorney, Agent, or Firm—Cushman Darby & Cushman, L.L.P.

[57] ABSTRACT

A circuit for detecting the recording/playback mode of a system, e.g., a video tape recorder (VTR), for recording/playing back an image signal on/from a recording medium, using first and second input signals derived from pilot signals also recorded on the recording medium. The circuit includes a first peak value detector for detecting the peak value of the first input signal, and for generating a first output signal representative of the peak value of the first input signal, and a second peak value detector for detecting the peak value of the second input signal, and for generating a second output signal representative of the peak value of the second input signal. The circuit further includes a comparator for comparing the first output signal and the second output signal, and for generating a comparison output signal representative of the difference therebetween and, a mode discrimination signal generating circuit, responsive to the comparison output signal, for generating a mode discrimination signal indicative of the recording mode that the image signal was recorded in, and the playback mode that the image signal is being played back in.

21 Claims, 4 Drawing Sheets

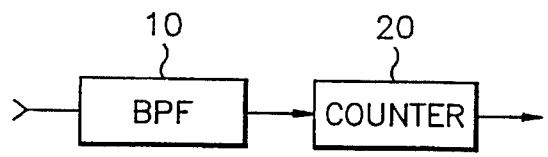
*FIG. 1*
*(PRIOR ART)*
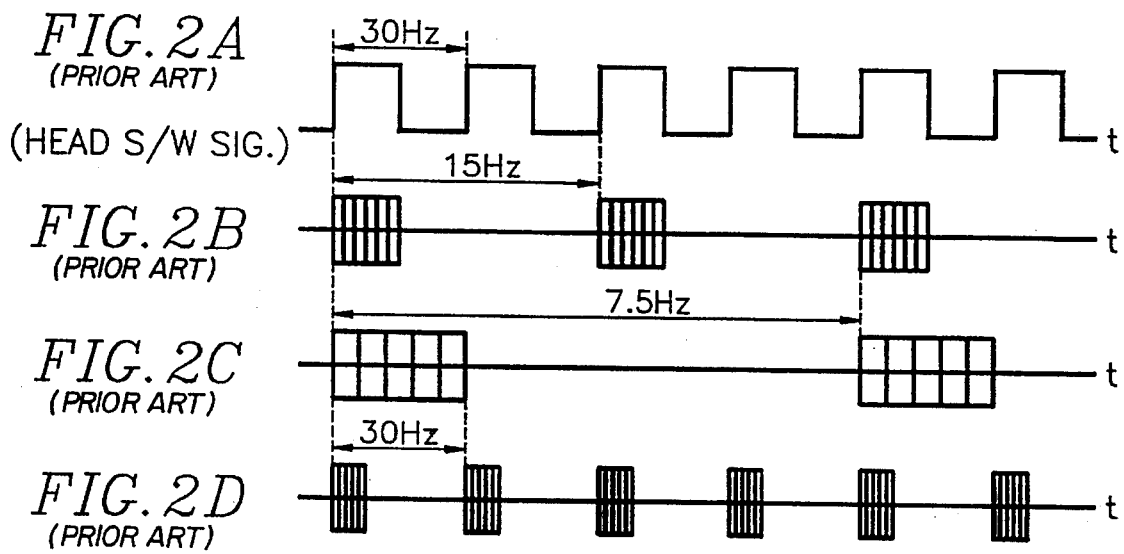
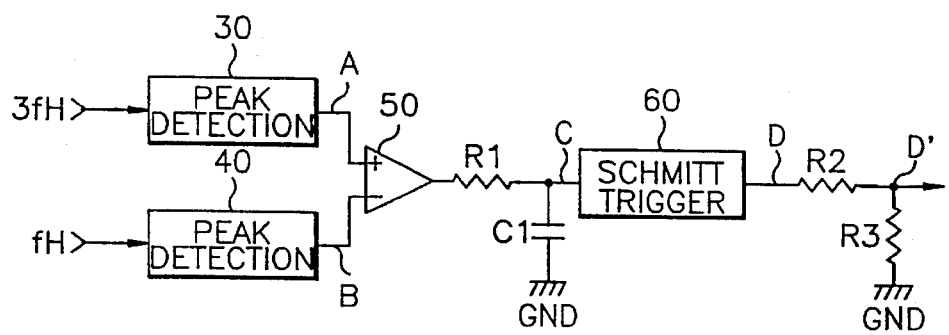
*FIG. 3*

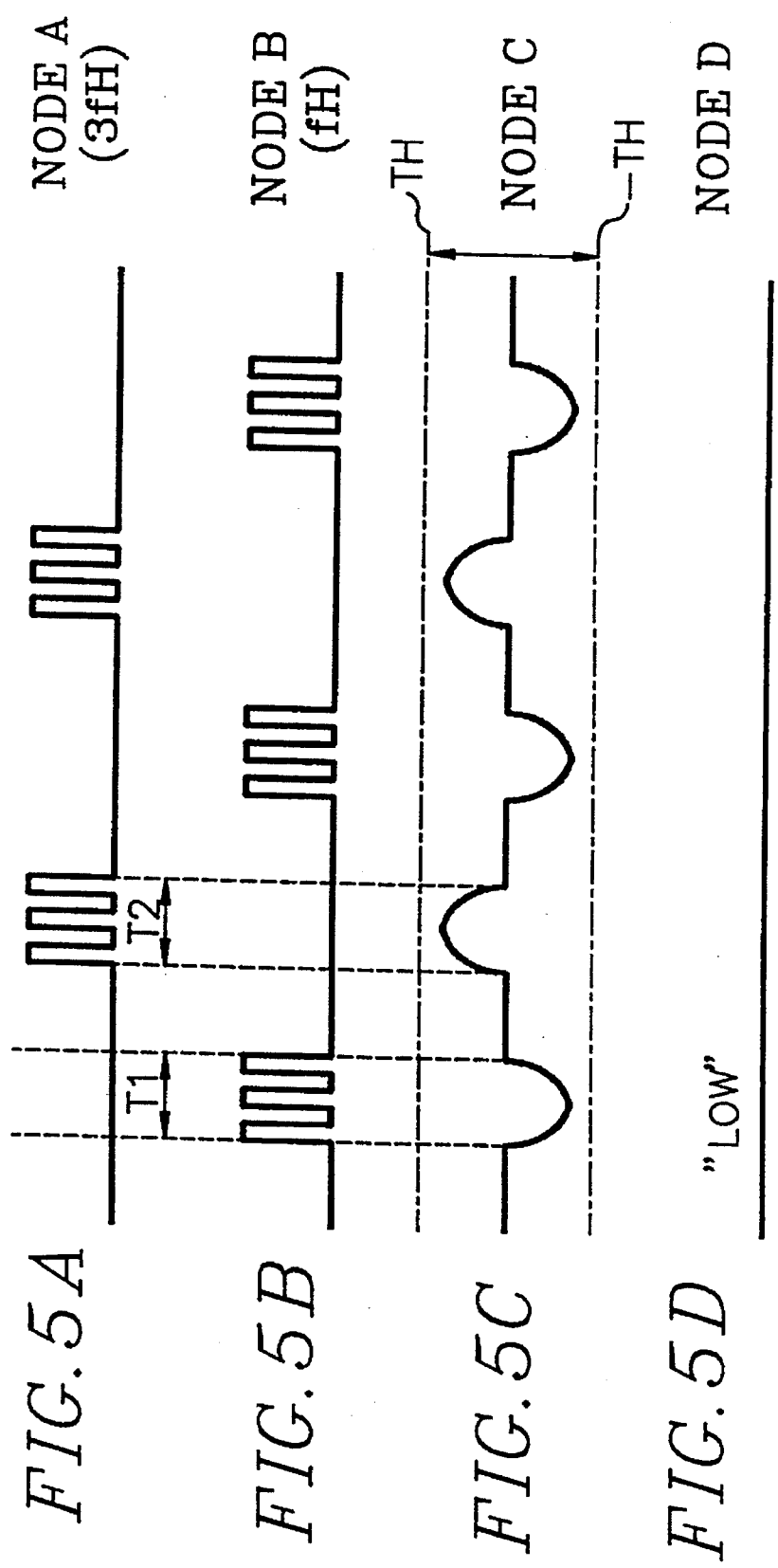

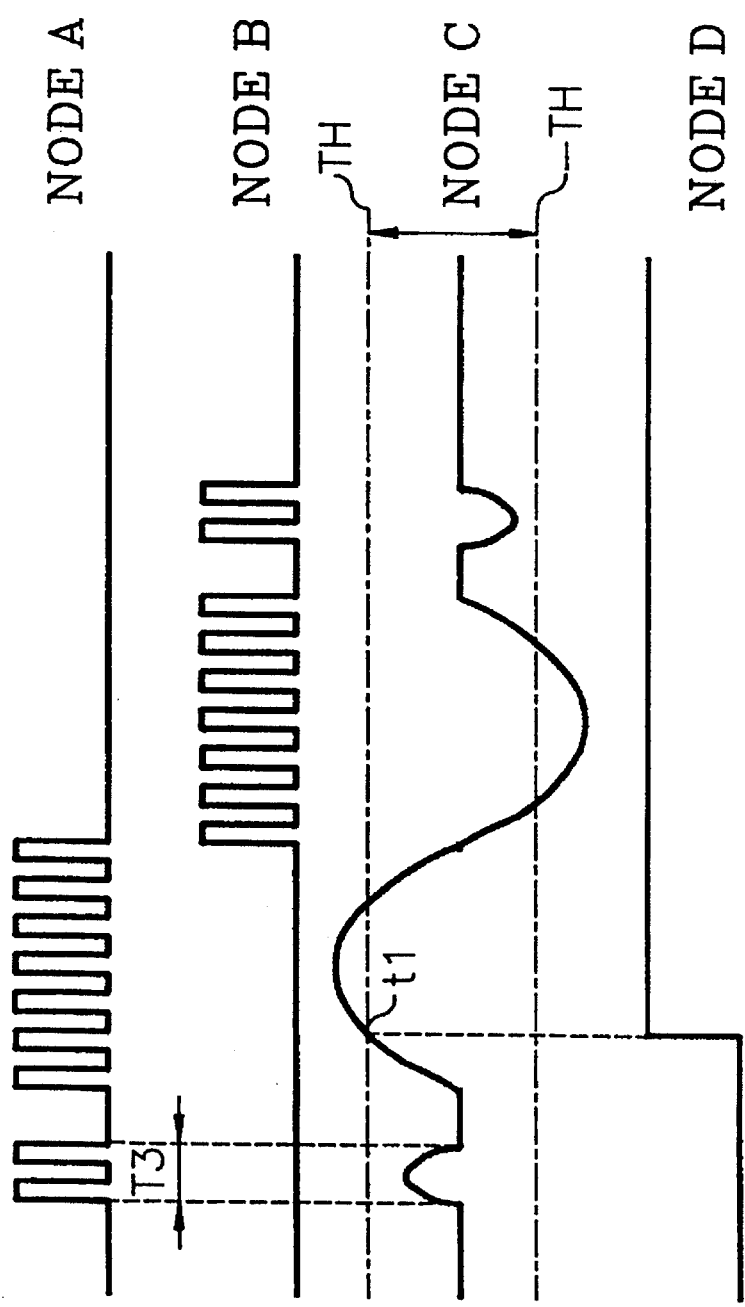

MODE DISCRIMINATION CIRCUIT FOR AN IMAGE RECORDING/PLAYBACK SYSTEM UTILIZING PEAK DETECTORS

BACKGROUND OF THE INVENTION

The present invention relates generally to image recording/playback systems, and, more particularly, to a circuit for detecting recording and playback modes in an image recording/playback system, e.g., in a video tape recorder (VTR).

Presently available VTRs, e.g., 8 mm VTRs, have an automatic track finding (ATF) function. The ATF function is facilitated by recording four pilot signals at four different frequencies f1, f2, f3, and f4, respectively, on one track of the magnetic video tape. The ATF function is implemented by means of a servo control mechanism which detects the pilot signals and determines the precise frequency thereof. Typically, the pilot signals will have frequencies f1, f2, f3, and f4 of 102 kHz, 119 kHz, 165 kHz, and 149 kHz, respectively.

With reference now to FIG. 1, there can be seen a block diagram of a conventional circuit for discriminating recording and playback modes in a VTR, whose operation is as follows. More particularly, a video playback signal read from a video tape being played back is applied to a bandpass filter 10. The video playback signal includes a luminance signal, a chrominance signal, and an audio signal. The bandpass filter 10 is comprised of four sub-bandpass filters (not shown) each having a different passband centered on the frequency of a respective one of the four pilot signals.

During playback, only one of the four pilot signals will pass through the bandpass filter 10, depending on the particular recording mode in which the video playback signal was recorded, and the playback mode in which the video playback signal is being played back. The output of the bandpass filter 10, which can be considered to be the selected pilot signal, is applied to a counter 20, which functions to generate an output signal having a frequency which is proportional to the frequency of the selected pilot signal. Additional circuitry (not shown) is responsive to the output of the counter 20 for generating a mode discrimination signal indicative of the recording mode in which the video playback signal was recorded, and the playback mode in which the video playback signal is being played back, in a manner more fully described below.

More particularly, with reference now to FIGS. 2A–2D, if the video playback signal was recorded in a standard play (SP) mode and is being played back in a long play (LP) mode, the frequency of the mode discrimination signal output by the counter 20 will be 7.5 Hz. Alternatively, if the video playback signal was recorded in an LP mode and is being played back in an SP mode, the frequency of the mode discrimination signal will be 30 Hz. Finally, if the video playback signal is recorded in the same mode (either LP or SP) that it is being played back, the mode discrimination signal will be 15 Hz.

The above-described conventional recording/playback mode discrimination circuit suffers from the following drawbacks and shortcomings. More particularly, due to the close frequency spacing between adjacent pilot signals, it is difficult to precisely filter out the frequency of the selected pilot signal. Further, because a number of counter stages are necessary for evaluating the frequency bandpassed by the bandpass filter 10, the circuit is unduly complex and unnecessarily large in size.

Based on the above, it can be appreciated that there presently exists a need in the art for a recording/playback mode discrimination circuit which eliminates the above-identified drawbacks and shortcomings of the presently available recording/playback mode discrimination circuits. The present invention fulfills this need.

SUMMARY OF THE INVENTION

The present invention encompasses a circuit for detecting the recording/playback mode of a system, e.g., a video tape recorder (VTR), for recording/playing back an image signal on/from a recording medium, using first and second input signals derived from pilot signals also recorded on the recording medium. The circuit includes a first peak value detector for detecting the peak value of the first input signal, and for generating a first output signal representative of the peak value of the first input signal, and a second peak value detector for detecting the peak value of the second input signal, and for generating a second output signal representative of the peak value of the second input signal. The circuit further includes a comparator for comparing the first output signal and the second output signal, and for generating a comparison output signal representative of the difference therebetween and, a mode discrimination signal generating circuit, responsive to the comparison output signal, for generating a mode discrimination signal indicative of the recording mode that the image signal was recorded in, and the playback mode that the image signal is being played back in.

In a preferred embodiment, the frequency of the first input signal is at least two times greater than that of the second input signal, and the mode discrimination signal has a first logic state when the image signal was recorded in a first mode, e.g., standard play mode, and is being played back in a second mode, e.g., long play mode, and a second logic state when the image signal was recorded in the second mode and is being played back in the first mode. Further, the circuit preferably further includes an integrator connected between the comparator and the mode discrimination signal generating circuit for integrating the comparison output signal, wherein the mode discrimination signal generating circuit is responsive to the integrated comparison output signal.

BRIEF DESCRIPTION OF THE DRAWINGS

These and various other features and advantages of the present invention will be readily understood with reference to the following detailed description taken in conjunction with the accompanying drawings, wherein like reference numerals designate like structural elements, and, in which:

FIG. 1 is a block diagram of a conventional recording/playback mode discrimination circuit;

FIGS. 2A–2D depict the waveforms of a head S/W signal (FIG. 2A), and of the recording/playback mode discrimination signal generated by the circuit depicted in FIG. 1 under different conditions (FIGS. 2B–2D);

FIG. 3 is a block diagram of a recording/playback mode discrimination circuit constructed in accordance with a preferred embodiment of the present invention;

FIGS. 5A–5D depict the waveforms of signals appearing at various respective nodes of the circuits depicted in FIGS. 4A and 4B, in the case where information recorded in a standard play mode is played back in a long play mode; and, FIGS. 6A–6D depict the waveforms of signals appearing at various resepctive nodes of the circuits depicted in FIGS. 4A and 4B, in the case where information recorded in a long play mode is played back in a standard play mode.

DETAILED DESCRIPTION OF THE INVENTION

Figure 4A:
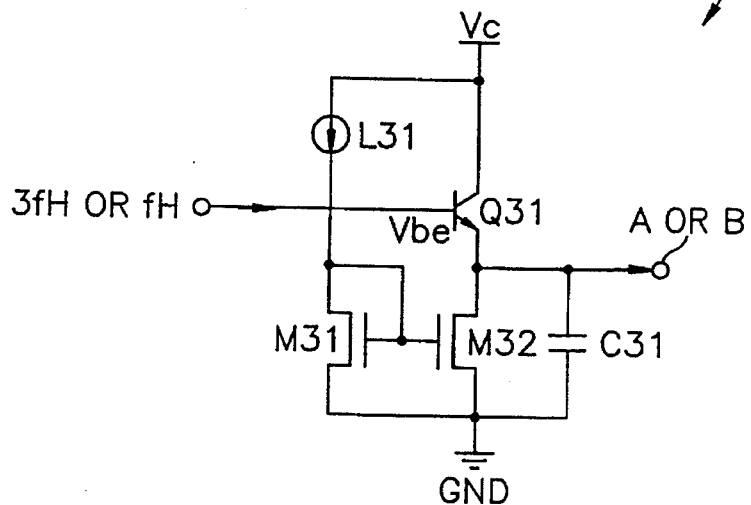
FIG. 4A is a circuit diagram of a preferred embodiment of the peak value detectors of the circuit depicted in FIG. 3.

With reference now to FIG. 3, a recording/playback mode discrimination circuit constructed in accordance with a preferred embodiment of the present invention will now be described. More particularly, the recording/playback mode discrimination circuit of the present invention includes a peak value detector 30 which receives at its input a first input signal 3fH, and a peak value detector 40 which receives at its input a second input signal fH. The frequencies of the first and second input signals vary depending upon the current recording/playback mode combination of the image recorder/playback system (e.g., VTR) in which the mode discrimination circuit is utilized. The first and second input signals can be derived from the pilot signals extracted from the video playback signal by any convenient circuitry well-known to those skilled in the pertinent art. Preferably, the first input signal constitutes the frequency difference between a first pair of the pilot signals and the second input signal constitutes the frequency difference between a second pair of the pilot signals. For example, if the first input signal constitutes the frequency difference between the pilot signals f1 and f2, and the second input signal constitutes the frequency difference between the pilot signals f1 and f4, then the frequency of the second input signal fH and the frequency of the second input signal 3fH will be as follows, it being understood, of course, that these values are not limiting to the present invention. If a video playback signal is recorded in a standard play mode and played back in a long play mode, the second input signal fH will be approximately 16 kHz and the first input signal 3fH will be approximately 46 kHz. If a video playback signal is recorded in a long play mode and played back in a standard play mode, the second input signal fH will be approximately 32 kHz and the first input signal 3fH will be approximately 92 kHz.

With continuing reference to FIG. 3, output terminal A of the peak value detector 30 is coupled to the non-inverting input terminal of a comparator 50 and output terminal B of the peak value detector 40 is coupled to the inverting input terminal of the comparator 50. The comparator 50 functions to compare the peak value of the first input signal 3fH output by the peak value detector 30 with the peak value of the second input signal fH output by the peak value detector 40, and produces an output signal representative of the difference between the peak values. The output of the comparator 50 is integrated by an integrator comprised of a resistor R1 and a capacitor C1, and then applied to to an input terminal C of a Schmitt trigger circuit 60. A resistor R2 is connected between the output terminal D of the Schmitt trigger circuit 60 and a recording/playback mode discrimination signal output terminal D'. A resistor R3 is connected between the recording/playback mode discrimination signal output terminal D' and a ground terminal. The resistors R2 and R3 function as a voltage divider for dividing the voltage of a logic signal output by the Schmitt trigger circuit 60, to thereby stabilize the logic level thereof.

With reference now to FIG. 4A, there can be seen a circuit diagram depicting a preferred embodiment of the peak value detector 30 or 40, it being understood that these peak value detectors are conveniently of identical construction. More particularly, the peak value detector 30 or 40 includes an NPN transistor Q31 the base of which is coupled to the first input signal 3fH or the second input signal fH, the collector of which is coupled to the power supply voltage Vc, and the emitter of which is coupled to output terminal A or B of the peak value detector 30 or 40.

The peak value detector 30 or 40 further includes an n-channel MOS transistor M32 whose drain-source channel is coupled between the output terminal A or B and the ground terminal in parallel with a capacitor C31. The capacitor C31 functions to prevent the voltage at the output terminal A or B from dropping below a predetermined minimum voltage level. Preferably, the capacitance of the capacitor C31 is adjustable, to thereby enable the clamping level of the output voltage at the output terminal A or B to be adjusted to any desired level.

The peak value detector 30 or 40 further includes a second n-channel MOS transistor M31 connected in series with an independent current source L31 between the power supply voltage Vc and the ground terminal. The gates of the NMOS transistors M31 and M32 are connected in common to the drain of the NMOS transistor M31. The NMOS transistors M31 and M32 together comprise a current mirror loop, with the current flowing through the channels of thereof varying in accordance with the switching state of the transistor Q31. The independent current source L31 can be conveniently replaced by a resistor (not shown) or any other suitable element for providing a constant current.

Figure 4B:
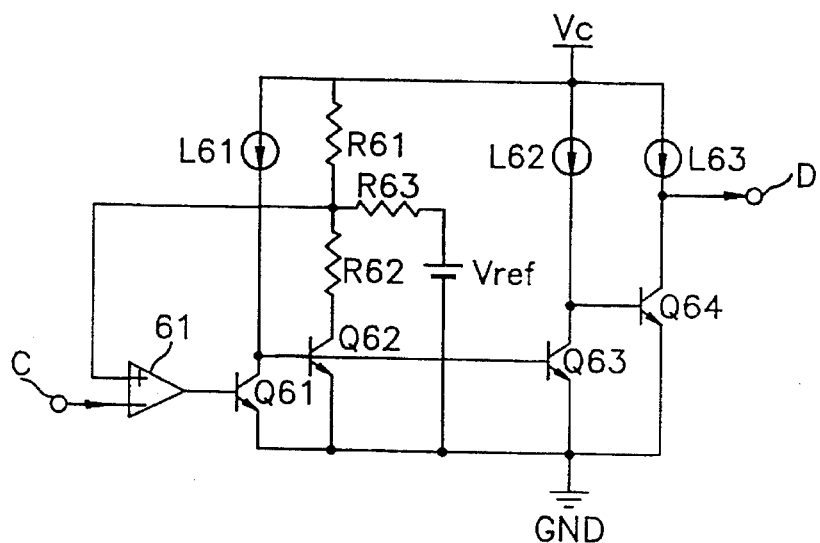
FIG. 4B is a circuit diagram of a preferred embodiment of the Schmitt trigger circuit of the circuit depicted in FIG. 3.

With reference now to FIG. 4B, there can be seen a circuit diagram depicting a preferred embodiment of the Schmitt trigger circuit 60 of the recording/playback discrimination circuit of the present invention depicted in FIG. 3. The Schmitt trigger circuit 60 includes resistors R61, R62, and R63, and a comparator 61 having a non-inverted input terminal coupled to the common node shared by the resistors R61, R62, and R63, and an inverted input terminal coupled to the input terminal C. The output of the comparator 61 is coupled to the base of an NPN transistor Q61. An independent current source L61 is coupled between the power supply voltage Vc and the collector of the transistor Q61. The emitter of the bipolar transistor Q61 is coupled to the ground terminal. The collector of the bipolar transistor Q61 is also coupled to the base of NPN transistor Q62, and to the base of NPN transistor Q63. The collector of the transistor Q62 is coupled to the resistor R62, and the emitter of the transistor Q62 is coupled to the ground terminal. An independent current source L62 is connected between the power supply voltage Vc and the collector of the bipolar transistor Q63. The collector of the bipolar transistor Q63 is also coupled to the base of NPN transistor Q64. The collector of the bipolar transistor Q64 is connected to the output terminal D of the Schmitt trigger circuit 60, and the emitter of the bipolar transistor Q64 is connected to the ground terminal. An independent current source L63 is connected between the power supply voltage Vc and the output terminal D. The independent current sources L61, L62, and L63 are all load elements and can be conveniently replaced by any other suitable type of load element, e.g., resistors.

The Schmitt trigger circuit 60 further includes a reference voltage source Vref having a negative terminal connected to the ground terminal and a positive terminal connected to an end of the resistor R63.

With reference now to FIGS. 3, 4A–4B, 5A–5D, and 6A–6D, the operation of the above-described recording/ playback mode discrimination circuit of the present invention will now be described.

With particular reference to FIG. 4A, if the voltage level of the input signal 3fH or fH is lower than the cut-in voltage Vbe of the transistor Q31, then the transistor Q31 will be turned off, thereby resulting in the voltage at the output node A or B of the peak value detector 30 or 40 to be set by the charge stored in the capacitor C31. Conversely, if the voltage level of the input signal 3fH or fH is higher than the cut-in voltage Vbe of the transistor Q31, then the transistor Q31 is turned on, thereby resulting in the voltage at the output node A or B to be charged up to the power supply voltage Vc.

With additonal reference now to FIG. 3, the comparator 50 functions to compare the peak value of the first input signal 3fH at the node A with the peak value of the second input signal fH at the node B. As a result, if the voltage level of the peak value of the first input signal 3fH is lower than that of the second input signal fH, the comparator 50 generates a negative comparison signal output, as in time interval T1 in FIG. 5C. Conversely, if the voltage level of the peak value of the first input signal fH is higher than that of the second input signal fH, the comparator 50 generates a positive comparison signal output, as in time interval T2 in FIG. 5C. The comparison signal output from the comparator 50 is integrated by the integrator comprised of resistor R1 and capacitor C1 shown in FIG. 3.

With particular reference now to FIG. 4B, the Schmitt trigger circuit 60 funcitons to compare the integrated comparison signal output present at the node C with a triggering voltage TH present at the common node shared by the resistors R61, R62, and R63. If the integrated comparison signal is lower than the triggering voltage TH, then the output of the comparator 61 goes "high", and the output signal appearing at the output terminal D of the Schmitt trigger circuit 60 is held "low" as in FIG. 5D. In this way, the device is prevented from responding to false or spurious signals, such as noise that may be present in the input signals applied thereto. Of course, the triggering level TH can be adjusted to a suitable level for the particular parameters of the intended operating environment.

In the case where the video playback signal was recorded on the video tape in a standard play mode and is being played back in a long play mode, the operation is as follows. More particularly, the frequency of the first input signal 3fH received at the input of the peak value detector 30 will be 46 kHz, and the frequency of the second input signal fH received at the input of the peak value detector 40 will be 16 kHz. Consequently, the voltage of the integrated comparison signal output from the comparator 50 and appearing at node C will be lower than the triggering level TH of the Schmitt trigger circuit 60, with the result that the recording/playback mode discrimination signal appearing at the output node D' will be in a "low" logical state.

In the case where the video playback signal was recorded on the video tape in a long play mode and is being played back in a standard play mode, the the frequency of the first input signal 3fH received at the input of the peak value detector 30 will be 92 kHz, and the frequency of the second input signal fH received at the input of the peak value detector 40 will be 32 kHz. Since the frequencies of the first and second input signals for this case, as shown in FIGS. 6A and 6B, respectively, are much higher than (double) they are for the previously described case, as shown in FIGS. 5A and 5B, respectively, the pulse trains of the peak values at the output nodes A and B of the peak value detectors 30 and 40, and thus, the comparison signals output from the comparator 50 are much more closely spaced, so that the output of the integrator comprised of the resistor R1 and the capacitor C1 becomes much higher than in the previously described case, as can be readily seen by comparing FIG. 6C with FIG. 5C.

More particularly, the component values are selected so that, in this case, the voltage level of the integrated comparison signal appearing at the node C, which is the input of the Schmitt trigger circuit 60, will be higher than the triggering level TH of the Schmitt trigger circuit 60, as shown at the point t1 in FIG. 6C, thereby causing the output of the comparator 61 to go "low", thereby causing the signal output at the output terminal D of the Schmitt trigger circuit 60 to go "high". Accordingly, in the case where the video playback signal is recorded in a long play mode and played back in a standard play mode, the recording/playback mode discrimination signal at the node D' will be in the "high" logic state.

Based on the foregoing description, it can be appreciated that the recording/playback mode discrimination circuit of the present invention dispenses with the need for the counter and bandpass filter that are utilized in presently available mode discrimination circuits, thereby resulting in a simpler and more compact circuit.

Although a preferred embodiment of the present invention has been described in detail hereinabove, it should be clearly understood that many variations and/or modifications of the basic inventive concepts herein taught which may appear to those skilled in the pertinent art will still fall within the spirit and scope of the present invention as defined in the appended claims. For example, the peak value detectors and the Schmitt trigger circuit disclosed herein may be substituted with other waveform shaping circuitry which provides a similar function. Further, although the first and second input signals have been chosen to differ in frequency by approximately 3X, it should be readily understood that any other suitable frequency difference, e.g., 2X may also be employed in the practice of the present invention.

What is claimed is:

1. A circuit for detecting the recording/playback mode of a system for recording/playing back an image signal on/from a recording medium, using first and second input signals derived from pilot signals also recorded on the recording medium, comprising:

a first peak value detector for detecting the peak value of said first input signal, and for generating a first output signal representative of the peak value of said first input signal;

a second peak value detector for detecting the peak value of said second input signal, and for generating a second output signal representative of the peak value of said second input signal;

a comparator for comparing said first output signal and said second output signal, and for generating a comparison output signal representative of the difference therebetween;

an integrator connected to said comparator, for integrating said comparison output signal, to thereby produce an integrated comparsion output signal; and, a mode discrimination signal generating circuit responsive to said integrated comparison output signal, for generating a mode discrimination signal indicative of the recording mode that the image signal was recorded in, and the playback mode that the image signal is being played back in.

2. The circuit as set forth in claim 1, further comprising a voltage divider connected between the output of said mode discrimination signal generating circuit and a ground voltage terminal.

3. The circuit as set forth in claim 1, wherein said first peak value detector comprises:
   a first transistor responsive to said first input signal, and having a conduction state dependent upon the magnitude of said first input signal;
   second and third transistors configured in the form of a current mirror and responsive to said conduction state of said first transistor; and,
   a capacitor coupled between said first transistor and said second transistor, for establishing a minimum level of said first output signal.

4. The circuit as set forth in claim 3, wherein said second peak value detector comprises:
   a first transistor responsive to said second input signal, and having a conduction state dependent upon the magnitude of said second input signal;
   second and third transistors configured in the form of a current mirror and responsive to said conduction state of said first transistor; and,
   a capacitor coupled between said first transistor and said second transistor, for establishing a minimum level of said second output signal.

5. The circuit as set forth in claim is wherein said mode discrimination signal generating circuit comprises a Schmitt trigger circuit.

6. The circuit as set forth in claim 4, wherein said mode discrimination signal generating circuit comprises a Schmitt trigger circuit.

7. The circuit as set forth in claim 1, wherein said mode discrimination signal has a first logic state when said image signal was recorded in a first mode and is being played back in a second mode, and has a second logic state when said image signal was recorded in a second mode and is being played back in a first mode.

8. The circuit as set forth in claim 6, wherein said mode discrimination signal has a first logic state when said image signal was recorded in a first mode and is being played back in a second mode, and has a second logic state when said image signal was recorded in a second mode and is being played back in a first mode.

9. The circuit as set forth in claim 8, wherein said system comprises a video tape recorder, and said first mode is a standard play mode and said second mode is a long play mode.

10. The circuit as set forth in claim 1, wherein said first input signal constitutes the frequency difference between a first pair of said pilot signals.

11. The circuit as set forth in claim 10, wherein said second input signal constitutes the frequency difference between a second pair of said pilot signals.

12. The circuit as set forth in claim 9, wherein said first input signal has a frequency which is approximately three times greater than that of said second input signal.

13. A circuit for detecting the recording/playback mode of a system for recording/playing back an image signal on/from a recording medium, using first and second input signals derived from pilot signals also recorded on the recording medium, comprising:
   means for detecting the peak values of said first and second input signals, and for generating first and second output signals representative of the peak value of said first input signal and the peak value of said second input signal, respectively;
   means for comparing said first output signal and said second output signal, and for generating a comparison output signal representative of the difference therebetween;
   means connected to said comparing means, for integrating said comparison output signal, to thereby produce an integrated comparison output signal; and,
   means responsive to said integrated comparison output signal for generating a mode discrimination signal indicative of the recording mode that the image signal was recorded in, and the playback mode that the image signal is being played back in.

14. The circuit set forth in claim 13, wherein said means for detecting peak values comprises:
   a first peak value detector for detecting the peak value of said first input signal and for generating said first output signal; and,
   a second peak value detector for detecting the peak value of said second input signal and for generating said second output signal.

15. The circuit as set forth in claim 14, wherein said first peak value detector comprises:
   a first transistor responsive to said first input signal, and having a conduction state dependent upon the magnitude of said first input signal;
   second and third transistors configured in the form of a current mirror and responsive to said conduction state of said first transistor; and,
   a capacitor coupled between said first transistor and said second transistor, for establishing a minimum level of said first output signal;
   and wherein further, said second peak value detector comprises:
   a first transistor responsive to said second input signal, and having a conduction state dependent upon the magnitude of said second input signal;
   second and third transistors configured in the form of a current mirror and responsive to said conduction state of said first transistor; and,
   a capacitor coupled between said first transistor and said second transistor, for establishing a minimum level of said second output signal.

16. The circuit as set forth in claim 13, further comprising a voltage divider connected between the output of said mode discrimination signal generating means and a ground voltage terminal.

17. The circuit as set forth in claim 13, wherein said first input signal has a frequency which is at least two times greater than that of said second input signal.

18. The circuit as set forth in claim 17, wherein said mode discrimination signal has a first logic state when said image signal was recorded in a first mode and is being played back in a second mode, and has a second logic state when said image signal was recorded in a second mode and is being played back in a first mode.

19. A circuit for detecting the recording/playback mode of a system for recording/playing back an image signal on/from a recording medium, using first and second input signals derived from pilot signals also recorded on the recording medium, comprising:
   means for detecting the peak values of said first and second input signals, and for generating first and second output signals representative of the peak value of said first input signal and the peak value of said second input signal, respectively;
   means for comparing said first output signal and said second output signal, and for generating a comparison output signal representative of the difference therebetween;

means responsive to said comparison output signal for generating a mode discrimination signal indicative of the recording mode that the image signal was recorded in, and the playback mode that the image signal is being played back in; and, wherein said first input signal has a frequency which is at least two times greater than that of said second input signal.

20. The circuit as set forth in claim 19, wherein said first input signal constitutes the frequency difference between a first pair of said pilot signals, and said second input signal constitutes the frequency difference between a second pair of said pilot signals.

21. The circuit as set forth in claim 19, wherein said frequency of said first input signal is at least three times greater than that of said second input signal.

* * * * *